US006327309B1

(12) United States Patent
Dreyer et al.

(10) Patent No.: US 6,327,309 B1
(45) Date of Patent: Dec. 4, 2001

(54) BIDIRECTION CHANNELS USING COMMON PINS FOR TRANSMIT AND RECEIVE PATHS

(75) Inventors: Stephen F. Dreyer, Los Altos Hills; Lee-Chung Yiu, Fremont; Robert X. Jin, San Jose, all of CA (US)

(73) Assignee: LSI Logic Corporation, Milpitas, PA (US)

( * ) Notice: Subject to any disclaimer, the term of this patent is extended or adjusted under 35 U.S.C. 154(b) by 0 days.

(21) Appl. No.: 09/216,501

(22) Filed: Dec. 18, 1998

Related U.S. Application Data

(63) Continuation of application No. 08/699,030, filed on Aug. 15, 1996.

(51) Int. Cl.$^7$ .................................................. H04B 3/00
(52) U.S. Cl. ........................ 375/258; 333/131; 375/257
(58) Field of Search ................................ 375/258, 219, 375/220, 222; 333/24 R, 25, 26, 131, 124, 125, 177; 370/278, 282; 379/93.05, 443, 394, 390, 399; 340/854.3, 854.8, 855.1

(56) References Cited

U.S. PATENT DOCUMENTS

| 4,220,816 |   | 9/1980  | Howells et al. ................. 370/24 |
|-----------|---|---------|----------------------------------------|
| 4,402,082 |   | 8/1983  | Cope .............................. 371/22 |
| 4,677,611 |   | 6/1987  | Yanosy, Jr. et al. ............... 370/85 |
| 4,897,831 |   | 1/1990  | Negi et al. ..................... 370/29 |
| 5,119,365 | * | 6/1992  | Warner et al. .................. 370/282 |
| 5,121,382 |   | 6/1992  | Yang et al. .................... 370/31 |
| 5,181,228 |   | 1/1993  | Takatori ........................ 375/103 |
| 5,210,773 |   | 5/1993  | Schmid et al. .................. 375/4 |
| 5,255,287 | * | 10/1993 | Davies et al. ................... 375/287 |
| 5,287,406 | * | 2/1994  | Kakuishi ....................... 379/404 |
| 5,289,458 |   | 2/1994  | Taha ............................ 370/16 |
| 5,410,594 | * | 4/1995  | Maruyama ....................... 379/398 |
| 5,414,708 |   | 5/1995  | Webber et al. .................. 370/85.3 |
| 5,444,740 |   | 8/1995  | Mizukami et al. ................ 375/286 |
| 5,455,409 | * | 10/1995 | Smith et al. .................... 235/385 |
| 5,467,369 |   | 11/1995 | Vijeh et al. .................... 375/224 |
| 5,490,171 |   | 2/1996  | Epley et al. .................... 375/257 |
| 5,499,269 |   | 3/1996  | Yoshino ......................... 375/257 |
| 5,506,900 | * | 4/1996  | Fritz ............................ 379/402 |
| 5,528,630 | * | 6/1996  | Ashley et al. ................... 375/258 |

(List continued on next page.)

OTHER PUBLICATIONS

"Broadcom turns defense technology know–how into communication ICs", Electronic Business Buyer, Cahners Publishing Company, Mar. 1995.

Buidenbach, Susan, "Do you Know What Your Cable Is?", LAN TIMES, Dec. 19, 1994.

Clause 23 "Physical coding sublayer (PCS), physical medium attachment sublayer (PMA) and baseband medium, type 100BASE–T4", Supplement to IEEE Std. 802.3 100BASE–T, IEEE 802.3u, Jun. 12, 1995, pp. 59–138.

"Digital Adaptive Equalization for High–Speed LANs", Broadcom's BCM5000 Fast–Φ Single–Chip Fast Ethernet Transceiver, pp. 1–4.

(List continued on next page.)

Primary Examiner—Chi Pham
Assistant Examiner—Emmanuel Bayard
(74) Attorney, Agent, or Firm—D Alessandro & Ritchie (57) ABSTRACT

A bidirectional communications interface employs the same path for transmitting and receiving. The bidirectional communications interface includes one two winding transformer for both transmit and receive and an integrated circuit having a transmitter and a receiver each connected to the same pair of input/output pins. The interface enables a communications node in a communications network to transmit data to and receive data from other nodes in the network.

11 Claims, 5 Drawing Sheets

U.S. PATENT DOCUMENTS

| | | | |
|---|---|---|---|
| 5,533,054 | | 7/1996 | DeAndrea et al. ............... 375/286 |
| 5,592,510 | | 1/1997 | Van Brunt et al. ............... 375/220 |
| 5,719,856 | | 2/1998 | May ................................. 370/282 |
| 5,726,976 | | 3/1998 | Thompson et al. ............... 370/229 |
| 5,838,722 | * | 11/1998 | Consi ............................... 375/219 |
| 5,878,030 | * | 3/1999 | Norris .............................. 370/241 |
| 5,878,221 | * | 3/1999 | Szkopek et al. .................. 709/218 |
| 6,104,707 | * | 8/2000 | Abraham ........................... 370/295 |

OTHER PUBLICATIONS

"10/100 Base–T4 Fast–Φ™ Transceiver", BCM50000–SP9 (Broadcom Corporation), Apr. 2, 1996, pp. 1–38.

CSMA Reference, "National Semiconductor Data", Apr. 15, 1994, pp. 1–63.

"100Base–T4/10BASE–T Fast Ethernet Transceiver (CAT3)", Doc. No. 38–00415 (Cypress–CY7C971), pp. 7–42 to 7–65.

"Local Natworks", Network World, The Newsweekly of Enterprise Network Computing, Jun. 24,1996, vol. 13, No. 26.

Shotwell, et al., "The Ethernet Sourcebook", pp. 281–286.

"10Mbps/100Mbps Lan Physical Layer Interface", (Intel–82553), pp. 1–60.

"100BASE–T Specification", Presentation Reprints from IEEE 802.3 High–Speed Study Group, Fast Ethernet Alliance, Mar. 7, 1994.

82506TB Twisted Pair Mau Chip (TP MAU), Nov. 1989, pp. 2–55.

McLean, Michelle Rae, "T4 Chips Herald Adapters, Hubs Users with Category 3 UTP have more 100Mbps choices", LAN TIMES, McGraw–Hill's Information Source for Network Computing, Jan. 23, 1995, vol. 12, Issue 2.

"A Section for Implementers of Enterprisewide Systems", PCWEEK Network.

"Ethernet switcher rolls", Electronic Engineering Times, The Industry Newspaper for Engineers and Technical Management, A CMP Publication, Jul 3, 1995, Issue 855.

McHale, Tom, "New Repeater Lowers Costs"Electronic Buyers' News, The Newspaper for OEM Product Sourcing & Vendor Partnering, EBN, Jul. 17. 1995.

Saunders, Stephen, "Category 5 UTP: Going, Going, Gone", Data Communications, McGraw–Hill's Networking Technology Magazine, Mar. 1995, pp. 57–60.

"Broadcom Leverages DSP for Ethernet Trust", Electronic News, Networking, vol. 41, No. 2048, Jan. 16, 1995.

Goldberg, Lee, "100BASE–T4 Chip Brings Speed to Today's LANS" As Seen in Electronic Design, Feb. 6, 1995.

* cited by examiner

BIDIRECTION CHANNELS USING COMMON PINS FOR TRANSMIT AND RECEIVE PATHS

This application is a continuation of Ser. No. 08/699,030 filed Aug. 15, 1996.

BACKGROUND OF THE INVENTION

1. Field of the Invention

This invention relates to the field of data communications. More specifically, it relates to the field of bidirectional data communications channels and to the field of bidirectional data communications channels for Fast Ethernet Local Area Network (LAN) communications and the IEEE standard for physical media connections referred to as 100BaseT4.

2. The Prior Art

For Fast Ethernet LAN communications (i.e. 100 MBit/sec), there are currently three approved IEEE standards for physical media connections. These three standards are commonly referred to as 100BaseTX (TX), 100BaseFX (FX), and 100BaseT4 (T4).

TX specifies that the transmission media is to be two pairs of unshielded twisted pair (UTP) cable of Category 5 or better. Of the two pairs, one pair is used as the transmission media for a dedicated transmit channel and the other pair is used as the transmission media for a dedicated receive channel. FX specifies that the transmission media is to be a fiber-optic cable. T4 specifies that the transmission media is to be four pairs of UTP cable of Category 3 or better.

Figure 1:
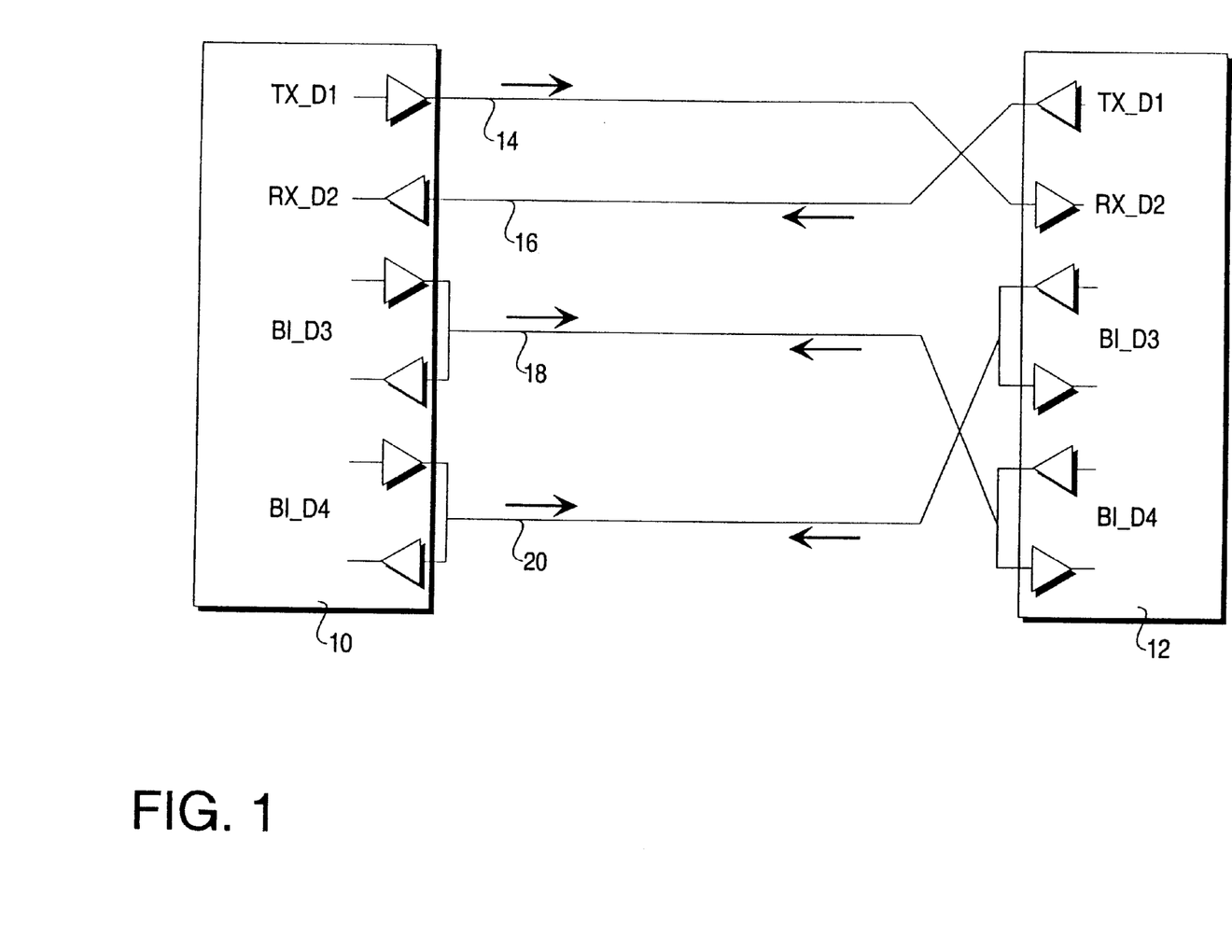
FIG. 1 is a block diagram of the 100BaseT4 communications scheme.

As used throughout this discussion, a "T4 device" is any device that is designed to communicate using the 100baseT4 standard. Referring initially to FIG. 1, a first T4 device 10 and a second T4 device 12 are shown hooked together according to the 100BaseT4 communication standard. As noted above, the 100baseT4 standard specifies that the transmission media is to be four pairs of unshielded twisted pair cable. Each of these pairs are shown schematically in FIG. 1 as lines 14, 16, 18, and 20. How each of the four pairs 14, 16, 18, and 20 is utilized depends on the perspective of the T4 device.

From the point of view of the first T4 device 10, the first pair 14 is the transmission media for a dedicated "transmit" channel and the second pair 16 is the transmission media for a dedicated "recieve" channel. From the point of view of the second T4 device 12 however, the first pair 14 is the transmission media for a dedicated "recieve" channel and the second pair 16 is the transmission media for a dedicated "transmit" channel. From either perspective, the third and fourth pairs 18 and 20 are each used as the transmission media for channels that both transmit and receive. The third and fourth channels are therefore "bidirectional" channels. Each of these bidirectional channels can be configured to be either a transmit channel or a receive channel, but neither can be configured for both transmit and receive simultaneously.

When the first T4 device 10 is transmitting, data signals are transmitted from the first T4 device 10 to the second T4 device 12 on the dedicated transmit channel of the first T4 device 10 and each of the two bidirectional channels while the dedicated receive channel of the first T4 device 10 is used by the first T4 device 10 for sensing a collision. A collision occurs when any data signals are received by the first T4 device 10 on its dedicated receive channel while data is being transmitted on any of the other three channels.

When the first T4 device 10 is receiving, data signals are received by the first T4 device 10 from the second T4 device 12 on the dedicated receive channel of the first T4 device 10 and each of the two bidirectional channels while the transmit channel of the first T4 device 10 is used to send a collision signal if required.

Even though a bidirectional channel can be configured as either a transmitter or a receiver, the impedance looking into the bidirectional channel of the T4 device must always be matched to the characteristic impedance of the transmission media that is attached to it. This is true whether the T4 device is transmitting or receiving.

There are two known configurations of prior-art bidirectional communications interfaces being used for T4 bidirectional channels. These are shown in FIGS. 2 and 3.

Figure 2:
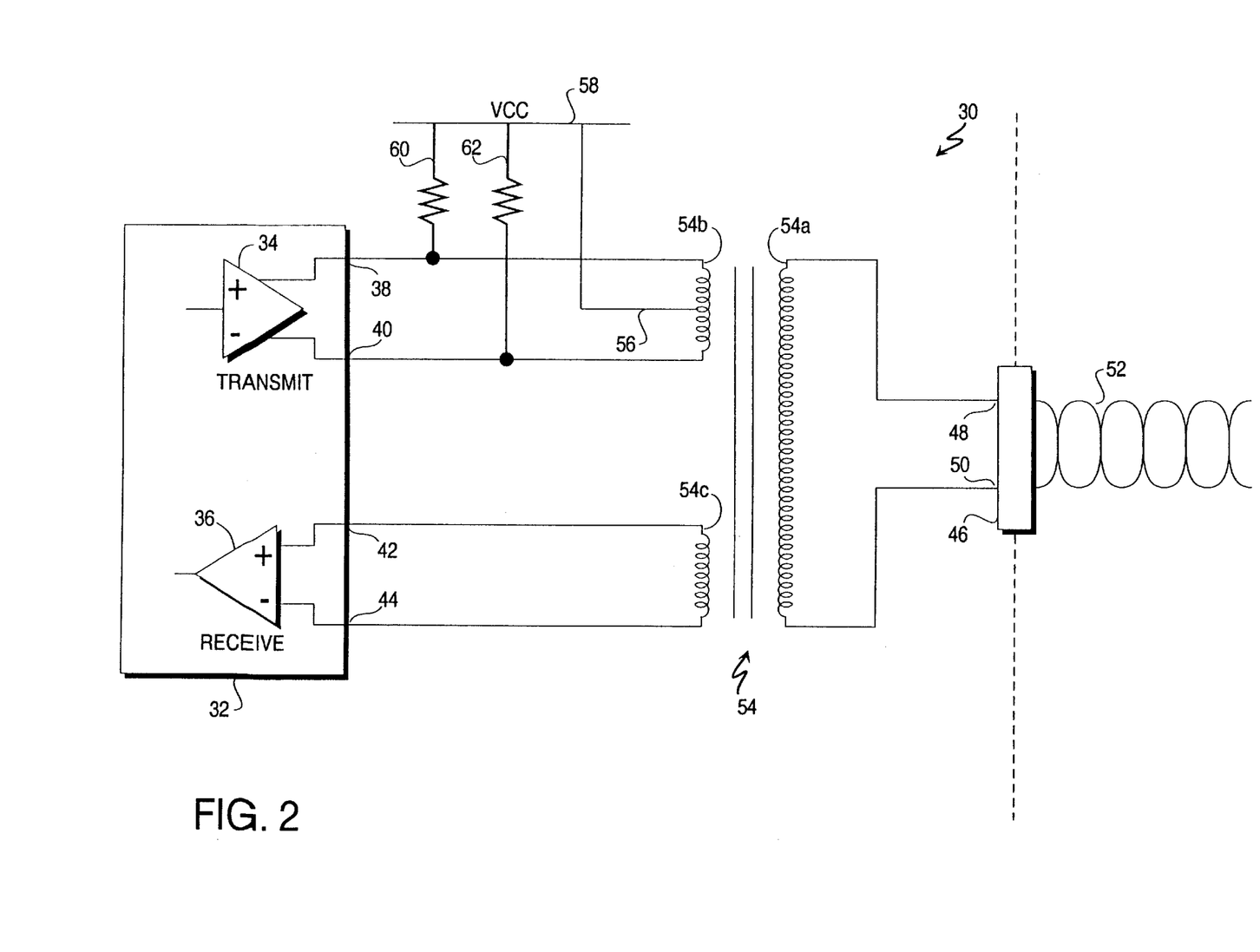
FIG. 2 is an electrical schematic diagram of a first prior art bidirectional communications interface.
Figure 3:
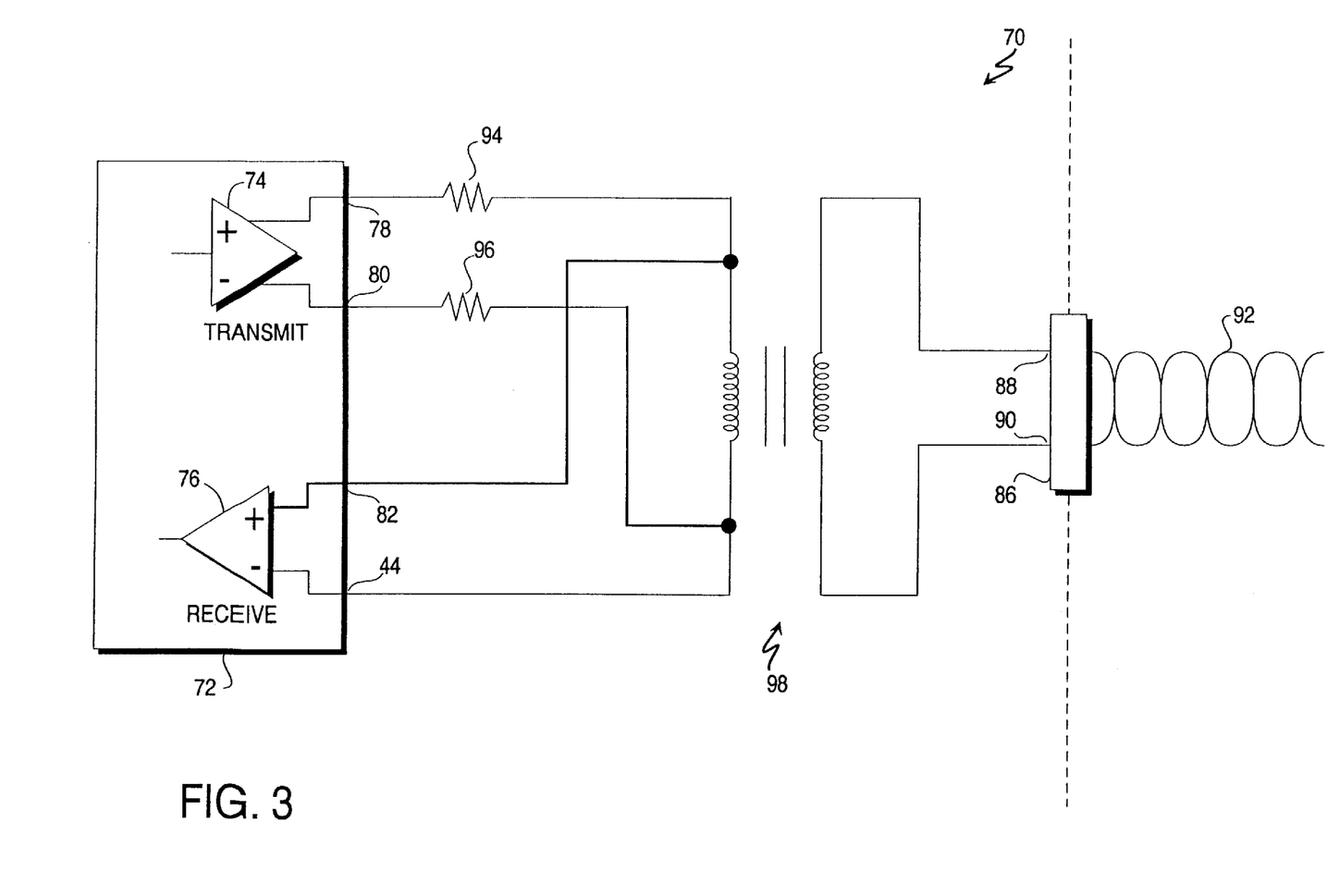
FIG. 3 is an electrical schematic diagram of a second prior art bidirectional communications interface.

Referring now to FIG. 2, the first prior-art bidirectional current source type communications interface 30 is shown. The first interface 30 includes an integrated circuit 32 that contains a transmitter 34 and a receiver 36. The output of transmitter 34 is connected to a pair of output pins 38 and 40. The input of receiver 36 is connected to a pair of input pins 42 and 44.

The first interface 30 has two paths from the four pins of the integrated circuit 32 identified above that are combined into a single path on two lines at connector 46. A transmit path has a first end at output pins 38 and 40 and a receive path has a first end at input pins 42 and 44. The transmit and receive paths are combined into a single bidirectional path such that both the transmit path and the receive path have a common second end at pins 48 and 50 of the connector 46. Transmission media 52 is connected to pins 48 and 50 of the connector 46.

According to the 100BaseT4 standard, the connector 46 is a RJ-45 connector and the transmission media 52 is a UTP cable that exhibits a characteristic impedance of 100 Ω.

In operation, a transmit data signal is generated by the transmitter 34 and enters the transmit path at the integrated circuit 32 at output pins 38 and 40. It then passes through a transformer, 54. Finally, it exits the transmit path and passes on to the transmission media 52 through pins 48 and 50 of the connector 46. The transformer 54 has a common first winding 54a that is coupled to both a second winding 54b and a third winding 54c. The second winding 54b has a center tap 56 which is connected to a fixed voltage potential VCC 58. A first resistor 60 is connected between pin 38 of the integrated circuit 32 and VCC 58. A second resistor 62 is connected between pin 40 of the integrated circuit 32 and VCC 58.

A receive data signal is generated by a remote device (not shown) on the transmission media 52 and enters the receive path at pins 48 and 50 of the connector 46. It then passes through transformer 54. Finally, it exits the receive path and passes into the integrated circuit 32 to receiver 36 at input pins 42 and 44.

In circuits which are integrated onto a semiconductor chip, it is desirable to provide the same functions using fewer pins or to provide more functions using the same number of pins. The advantage of using fewer pins is that it reduces the size of the chip and the expense of packaging the chip. For example, a design that uses only two pins to perform a function is superior to a design that uses four pins to perform the same function. Similarly, in circuits requiring magnetics, it is desirable to provide the same function using fewer or smaller magnetics. The advantage of using fewer or smaller magnetics is that it takes up less space and is less expensive. For example, a design that uses only one two winding transformer to perform a function is superior to a design that uses a pair of two winding transformers or a three winding transformer to perform the same function.

Also, in electrical circuits, it is desirable to provide the same function using fewer separate paths. The advantage of using fewer circuit paths is also that it takes up less space and is less expensive. For example, a design that uses only one path to perform a function is superior to a design that uses two paths to perform the same function.

The first bidirectional communications interface 30 is less than ideal by virtue of the fact that it uses two pairs of input/output (I/O) pins, output pins 38 and 40 and input pins 42 and 44, at the integrated circuit 32 it uses a three winding transformer 54, and it uses two paths for transmit and receive. These each add to the cost and the size of the T4 device.

Referring now to FIG. 3, a second prior-art bidirectional voltage source type communications interface 70 is shown. The second interface 70 includes an integrated circuit 72 that contains a transmitter 74 and a receiver 76. The output of transmitter 74 is connected to a pair of output pins 78 and 80. The input of receiver 76 is connected to a pair of input pins 82 and 84.

The second interface 70 also has two paths from the four pins of the integrated circuit 72 identified above that are combined into a single path on two lines at a connector 86. A transmit path has a first end at output pins 78 and 80 and a receive path has a first end at input pins 82 and 84. The transmit and receive paths are combined into a single bidirectional path such that both the transmit path and the receive path have a common second end at pins 88 and 90 of the connector 86. Transmission media 92 is connected to pins 88 and 90 of the connector 86.

A transmit data signal is generated by the transmitter 74 and enters the transmit path at the integrated circuit 72 at output pins 78 and 80. It then passes through series resistors 94 and 96 and a transformer 98. Finally, it exits the transmit path and passes on to the transmission media 92 through pins 88 and 90 of the connector 86.

A receive data signal is generated by a remote device (not shown) on the transmission media 92 and enters the receive path at pins 88 and 90 of the connector 86. It passes through the transformer 98. Finally, it exits the receive path and passes into the integrated circuit 72 to receiver 76 at input pins 82 and 84.

The second prior-art bidirectional communications interface 70 is also less than ideal by virtue of the fact that it uses two pairs of I/O pins, output pins 78 and 80 and input pins 82 and 84, at the integrated circuit 72 and it uses two paths for transmit and receive. These each add to the cost and the size of the T4 device.

OBJECTS AND ADVANTAGES OF THE INVENTION

Accordingly, it is an object of the present invention to provide a bidirectional communications interface having an integrated circuit that has a common pair of I/O pins for both transmit and receive and only one two winding transformer.

It is a further object of the present invention to provide a bidirectional communications interface having a common transmit and receive path.

Yet a further object of the present invention is to provide an integrated circuit that has a common pair of I/O pins for both transmit and receive for a bidirectional communications interface.

These and many other objects and advantages of the present invention will become apparent to one of ordinary skill in the art from a consideration of the drawings and ensuing description of the invention.

SUMMARY OF THE INVENTION

In accordance with the present invention, a bidirectional communications interface includes an integrated circuit and a transformer for interfacing to a transmission media. The integrated circuit provides a transmitter and a receiver on the same chip. The transmitter output and the receiver input both share the same pair of pins on the integrated circuit. The pins function selectively as either inputs or outputs. The transformer is a conventional two winding transformer. The bidirectional communications interface provides a common path for both transmitting and receiving.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

Figure 4:
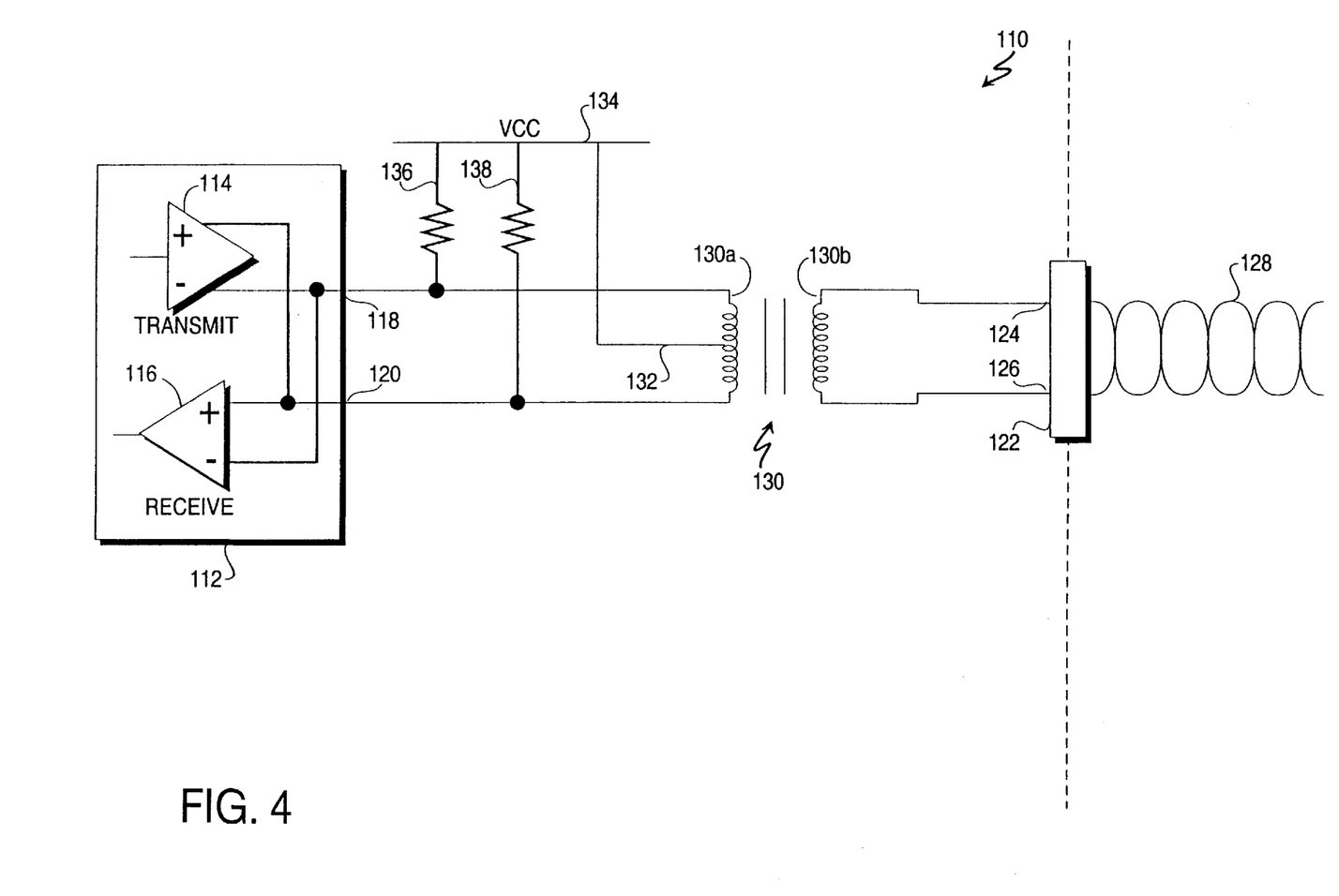
FIG. 4 is an electrical schematic diagram of a preferred embodiment of a bidirectional communications interface according to the present invention.

Referring now to FIG. 4, a bidirectional communications interface 110 according to the present invention is shown. The interface 110 includes an integrated circuit 112 that contains a transmitter 114 and a receiver 116. Both the transmitter 114 and the receiver 116 are connected to a single pair of I/O pins 118 and 120.

In a presently preferred configuration, the transmitter 114 and the receiver 116 can be of conventional design except as noted below with reference to FIG. 5. The output impedance of the transmitter 114 has a value much greater than that of the characteristic impedance of the transmission media 128 and preferably greater than 10 k$\Omega$. The input impedance of the receiver 116 also has a value much greater than that of the characteristic impedance of the transmission media 128 and preferably greater than 10 k$\Omega$.

The interface 110 has a single bidirectional path for both transmit and receive between the integrated circuit 112 and a connector 122. At the integrated circuit 112, the single path has a first end at I/O pins 118 and 120. At the connector 122, the single path has a second end at pins 124 and 126. A transmission media 128 is connected to pins 124 and 126 of the connector 122.

A transmit data signal is generated by the transmitter 114 and enters the single path at the integrated circuit 112 at I/O pins 118 and 120. It then passes through a transformer 130. Finally, it exits the single path and passes on to the transmission media 128 through pins 124 and 126 of the connector 122.

A receive data signal is generated by a remote device (not shown) on the transmission media 128 and enters the single path at pins 124 and 126 of the connector 122. It passes through the transformer 130. Finally, it exits the single path and passes into the integrated circuit 112 to receiver 116 at I/O pins 118 and 120.

The transformer 130 has a first winding 130a and a second winding 130b. The first winding 130a has a center tap 132 which is connected to a fixed voltage potential VCC 134. A first resistor 136 is connected between pin 118 of the integrated circuit 112 and VCC 134. A second resistor 138 is connected between pin 120 of the integrated circuit 112 and VCC 134. One of ordinary skill in the art will realize that although resistors 136 and 138 and center tap 132 are all connected to a fixed voltage source, there is no requirement that they all be connected to the same fixed voltage source.

In a presently preferred configuration, the transformer 130 is a conventional two winding transformer and has a winding ratio of 2:1 where the first winding 130a is the primary winding. The resistors 136 and 138 each have a resistance value of 200 Ω.

This presently preferred configuration of bidirectional communications interface 110 benefits from the advantages that it only requires one pair of I/O pins 118 and 120 at the integrated circuit 112, one two winding transformer 130, and one path for transmit and receive. Each of these result in a lower cost and a more compact design than either of the prior art interfaces shown in FIG. 2 or 3.

As one skilled in the art will realize, in any communications system, the need for impedance matching between the elements of the system is important. One problem that arises, however, when a circuit designer plans to share the same pins for the transmitter and the receiver is that the designer has to make sure that the transmitter and the receiver impedances does not effect each other or affect effect the ability of a matching network to match the characteristic impedance of the transmission media.

In a presently preferred configuration, the impedance looking into the second winding 130b of the transformer 130 is selected to match the characteristic impedance of the transmission media 128. The resistors 136 and 138 and the center tap form one example of a matching network. The values of the resistors 136 and 138 have been chosen such that the matching network has an impedance that matches the characteristic impedance of the transmission media 128.

A second problem that arises when a designer plans to share the same pins for the transmitter and the receiver is that the designer has to make sure that the transmitter and the receiver have the same common mode voltage level and can accommodate the same magnitude of voltage swings.

In a presently preferred configuration, the combination of the resistors 136 and 138 and the center tap 132 each being tied to VCC 134 and the transmitter 114 having a current source output 135 results in the common mode voltage level for the transmitter 114 being equal to VCC. The corresponding voltage swings for the transmitter 114 therefore center around VCC. The magnitude of the voltage swings depends on the magnitude of the output current from the transmitter 114 and the loading impedances from the resistors 136 and 138 and the transmission media 128. This output current magnitude is chosen to meet output voltage level requirements in IEEE Standard 802.3u-1995, Clause 23. IEEE Standard 802.3u-1995, Clause 23, is hereby expressly incorporated by reference as if set forth fully herein.

The resulting common mode voltage level and the magnitude of the voltage swings for the transmitter 114 may be too great for a receiver to handle without compensating circuitry. So, compensating circuitry has been added to the receiver 116 in a presently preferred configuration. One configuration of compensating circuitry is shown in FIG. 5 in the form of a block diagram. This is the presently preferred configuration, but other configurations will suggest themselves to one of ordinary skill in the art and are considered within the scope of the inventive concepts disclosed herein.

Figure 5:
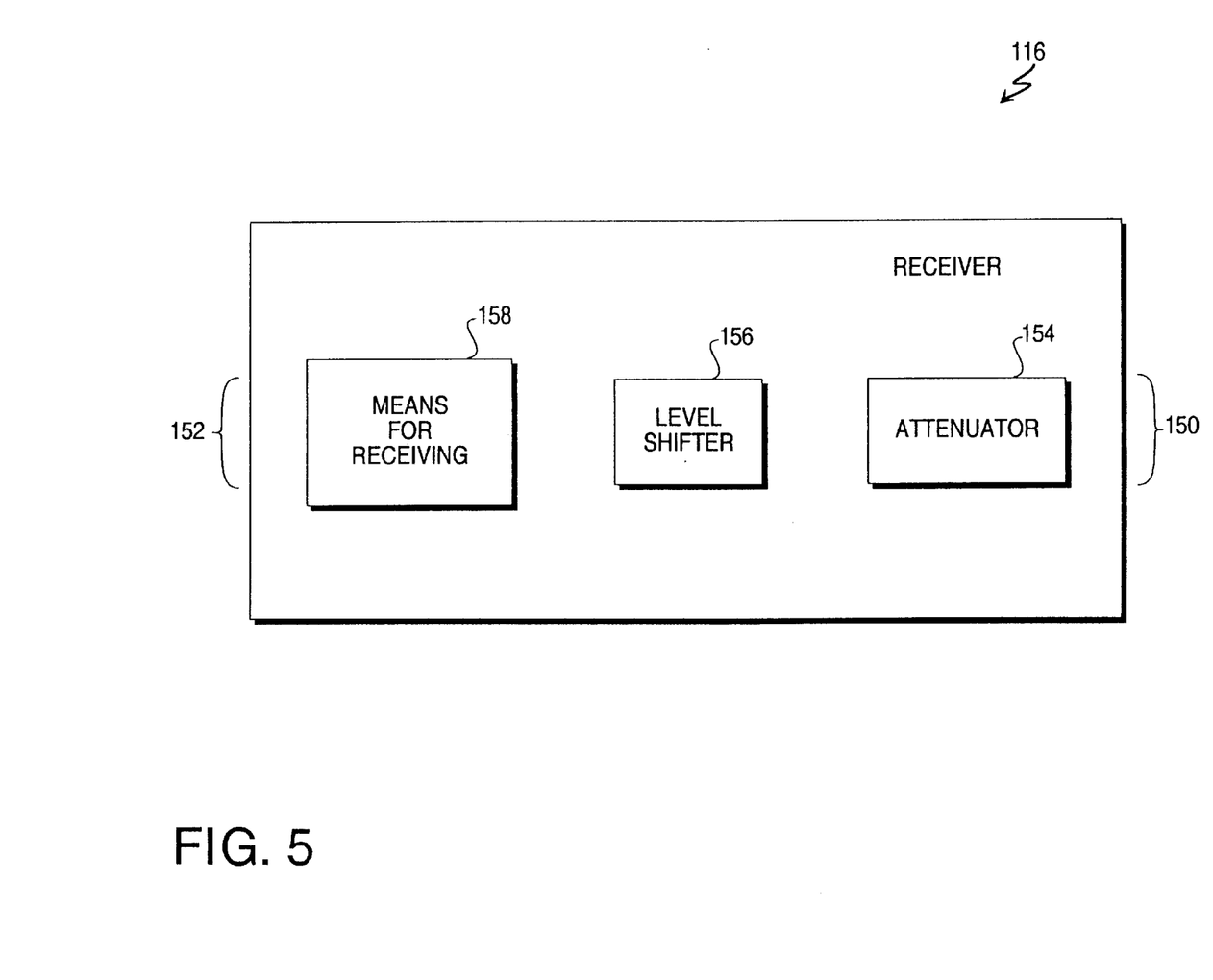
FIG. 5 is a block diagram of a preferred embodiment of a receiver according to the present invention.

Referring now to FIG. 5, the receiver 116 of FIG. 4 is shown. The receiver 116 is only one of the devices contained on the integrated circuit 112 of FIG. 4. The receiver 116 has an input 150 and an output 152. The input 150 is connected to the pair of I/O pins 118 and 120 of FIG. 4. The output 152 is connected to other devices (not shown) located on the integrated circuit 112.

The receive data signal enters the receiver 116 at the input 150. It passes into an attenuator 154 which reduces the magnitude of the voltage swings to an appropriate magnitude for the receiver 116. Then the signal passes into a level shifter 156 which converts the common mode voltage level of VCC to an internal voltage level between VCC and ground which the receiver 116 can properly handle. At this point, the common mode voltage level and the magnitude of the voltage swings have been compensated for in the receiver 116.

Then the signal passes into a means for receiving 158 which functions similarly to that of the prior art devices and is well known to one of ordinary skill in the art and will not be further elaborated on here. Finally, the signal passes out of the receiver 116 and onto other devices located on the integrated circuit 112 of FIG. 4 through the output 152.

With the two major design problems solved, the bidirectional communications interface of the present invention provides a common transmit and receive path with only one two winding transformer and one pair of I/O pins on the integrated circuit. (Note, a three winding transformer with two windings connected together at a node would also work as well as those of ordinary skill in the art will readily appreciate).

The bidirectional communications interface of the present invention can be incorporated as each of the two bidirectional channels in a T4 device as described above. This T4 device can be part of a larger collection of devices that would constitute a communications node in a communications network. The network would consist of a number of nodes that are all linked together. The T4 device would be used to establish communication between the node and the network.

For example, a number of computers with monitors could each contain a T4 device and constitute individual nodes in a communication network. A printer which also has a T4 device could constitute a node in the network. Using the T4 devices, each computer node could communicate with the printer node and/or each other computer node.

The specific application of the bidirectional communications interface of the presently preferred embodiment of the invention has been shown and described here in the context of IEEE standard for physical media connections for Fast Ethernet referred to as 100BaseT4 as defined in IEEE Standard 802.3u-1995, Clause 23. However, one of ordinary skill in the art will recognize the general applicability of the present invention to other bidirectional communications schemes whether existing now or in the future. These applications are possible without departing from the inventive concepts set forth herein. The invention, therefore, is not to be limited except in the spirit of the appended claims.

What is claimed is:

1. An integrated circuit device for use in a bidirectional communications interface for a communications node in a communications network wherein the interface is adapted for connection to a transmission media that exhibits a characteristic impedance, the interface comprising a transformer having a first winding connected across the transmission media and a second winding and a matching network that exhibits a characteristic impedance connected across the second winding of the transformer wherein the impedance of the matching network is matched to the characteristic impedance of the transmission media, the device comprising:

at least one pair of input/output pins for connection across the second winding of the transformer, said at least one pair of input/output pins having a terminal impedance;

at least one transmitter having an output connected across said at least one pair of input/output pins, said output having an output impedance value greater than said terminal impedance; and at least one receiver having an input connected across the at least one pair of input/output pins, said input having an input impedance value greater than said terminal impedance so as to minimize the effect of said input impedance value on said terminal impedance when said input is coupled to said pair of input/output pins.

2. The device of claim 1 wherein said transmitter has a current source output.

3. The device of claim 1 wherein said receiver comprises an attenuator and a level shifter at said input.

4. A transceiver for transmitting or receiving signals from an impedance matching network having a first I/O port and a second I/O port, said first I/O port having a first impedance matching a characteristic impedance of a transmission line, and said second I/O port having a second impedance, said transceiver comprising:

a receiver having an input port adapted for coupling to said second I/O port, said input port having an input impedance greater than the second impedance;

a transmitter having an output port adapted for coupling to said second I/O port, said output port having an output impedance greater than the second impedance; and wherein said matching, network has a resistor network that causes said receiver and said transmitter to operate at a common mode voltage equivalent to a VCC potential.

5. The transceiver of claim 4, wherein said transmitter includes a current source that provides a differential output signal having a voltage magnitude that swings above and below said VCC potential.

6. The transceiver of claim 5, wherein said receiver includes an attenuator coupled to said input port and configured to reduce said magnitude.

7. The transceiver of claim 4, wherein said receiver includes a level shifter configured to reduce said common mode voltage below said VCC potential.

8. A bi-directional circuit for transmitting or receiving a signal through a signal transmission line having a characteristic impedance, comprising:

an impedance matching network having a first I/O port and a second I/O port, said first I/O port having a first impedance matching the characteristic impedance, and said second I/O port having a second impedance;

a receiver having an input port adapted for coupling to said second I/O port, said input port having an input impedance greater than the second impedance;

a transmitter having an output port adapted for coupling to said second I/O port, said output port having an output impedance greater than the second impedance; and wherein said receiver and said transmitter operate at a common mode voltage equivalent to a VCC potential.

9. The bi-directional circuit of claim 8, wherein said second I/O port includes a first resistor having a first end and a second end, and a second resistor having a third end and a fourth end, said resistors coupled at said second end and said third end to form a node, and wherein said first end and said second end are coupled to said second I/O port.

10. The bi-directional circuit of claim 9, wherein said node is coupled to said VCC potential.

11. The bi-directional circuit of claim 9, wherein said impedance matching network includes a transformer having a first winding with a center tap coupled to said node.

* * * * *